United States Patent [19]

Schneider et al.

[11] Patent Number: 4,469,516
[45] Date of Patent: Sep. 4, 1984

[54] PIGMENT PREPARATIONS; PROCESS FOR THEIR MANUFACTURE AND THEIR USE

[75] Inventors: Manfred Schneider, Eppstein; Reinhold Deubel, Bad Soden am Taunus; Rainer Schunck, Kelkheim, all of Fed. Rep. of Germany

[73] Assignee: Hoechst Aktiengesellschaft, Frankfurt, Fed. Rep. of Germany

[21] Appl. No.: 450,468

[22] Filed: Dec. 16, 1982

Related U.S. Application Data

[63] Continuation-in-part of Ser. No. 272,092, Jun. 10, 1981, abandoned, which is a continuation of Ser. No. 137,588, Apr. 7, 1980, abandoned.

[30] Foreign Application Priority Data

Apr. 9, 1979 [DE] Fed. Rep. of Germany ....... 2914299
Apr. 8, 1980 [JP] Japan .................................. 55-45296

[51] Int. Cl.$^3$ ............................................. C09D 11/02
[52] U.S. Cl. ....................................... 106/23; 106/27; 106/28; 106/29; 106/308 F; 106/308 N
[58] Field of Search ...................... 106/27, 28, 29, 23, 106/308 F, 308 N, 228, 266; 260/DIG. 38

[56] References Cited

U.S. PATENT DOCUMENTS 3,300,424 1/1967 Hoenel et al. ......................... 260/21
3,635,745 1/1972 Rentel et al. ......................... 106/309
3,694,238 9/1972 Tinghitella et al. .................. 106/30

*Primary Examiner*—John Kight, III
*Assistant Examiner*—Amelia B. Yarbrough
*Attorney, Agent, or Firm*—Connolly & Hutz

[57] ABSTRACT

Aryl-pararosaniline sulfonic acid pigments can be transformed into a pigment preparation having high tinctorial strength and being easily dispersible by dissolving them in aqueous alkali, adding a water-soluble synthetic resin (being a reaction product or mixture of (I) maleic anhydride addition product of an unsaturated fatty acid or fatty acid polyol ester, said addition product being partially esterified with a polyol, and (II) a low-molecular curable and partially etherified aminoplast and optionally an anionic or nonionic surfactant and precipitating the preparation with a mineral acid. These preparations are especially useful for pigmenting printing inks, carbon paper, duplicating papers and typewriter ribbons.

14 Claims, No Drawings

PIGMENT PREPARATIONS; PROCESS FOR THEIR MANUFACTURE AND THEIR USE

This is a continuation-in-part application of application Ser. No. 272,092 filed June 10, 1981, now abandoned which in turn is a continuation application of application Ser. No. 137,588 filed Apr. 7, 1980, now abandoned.

The present invention relates to easily dispersible pigment preparations of high tinctorial strength in which the pigments alone are difficulty dispersible arylpararosaniline sulfonic acid pigments of the formula

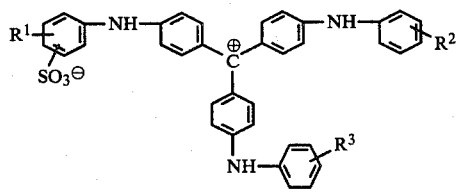

in which $R^1$, $R^2$ and $R^3$ are hydrogen, chlorine, bromine, alkyl or alkoxy with from 1 to 3 carbon atoms each, and the pigments are combined with resinous modifiers. According to the present invention improved combinations result when the resinous modifiers are synthetic resins that are water-soluble when partially or completely neutralized with a nitrogen base, and said resins consist essentially of mixtures or partial reaction products of (I) an addition compound which has been obtained by a practically complete binding of 1 part by weight of maleic anhydride to about 3 to 6, preferably 3 to 4.5, parts by weight of an unsaturated fatty acid containing only double bonds which are isolated or, if conjugated, are present in sets of no more than two conjugated double bonds, or of a polyol ester deriving from said unsaturated fatty acid and free from hydroxy groups, said addition compound being partially esterified with a polyol, and (II) a low-molecular curable aminoplast partially etherified with an alcohol selected from the group consisting of primary alcohols and polyols having at least one primary hydroxy group, the components I and II being present in approximately equivalent amounts with regard to the ester-forming groups, as well as optionally an anionic or non-ionic surfactant.

It is already known that the aqueous press cakes of the pigments from the series of aryl-pararosaniline sulfonic acids form especially hard agglomerates when they are dried, due to their pronounced polar character. Said agglomerates must be disintegrated when being incorporated in the media to be pigmented, for example printing inks, varnishes or plastic materials, and such disintegration requires a considerable amount of mechanical energy. If the disintegration is not complete—which may happen with the lowest possible dispersion times that are common nowadays—the processing of the pigments may involve a great number of disturbances. Apart from prints showing too weak a tinctorial strength or containing specks, for example, there may be a premature destruction of the printing block with which the pigments are applied.

In order to avoid these difficulties, pigments of this group are frequently employed as flushing pastes in special varnishes. Apart from the flushing process with its discontinous operation and the necessary apparatuses involved, the flushing pastes are frequently obtained with a relatively low pigment content only (in most cases between 35 and 45% by weight). Besides, the high content of binding agents in the flushing pastes makes the formulation of special printing ink compositions difficult. Also the possible fields of application for the flushing pastes are rather limited due to the flushing varnish employed, since in the preparation process the hydrophilic character, the tendency to flushing, the pigment wetting and other properties of the varnish have to be taken into consideration. This is why the selection of the optimum composition with regard to the intended purpose is very difficult. For example, the brands flushed in varnishes drying by oxidation cannot be used for the preparation of carbon papers of typewriter ribbons. Besides, the emptying of containers with flushing pastes presents another problem to the fabricator, as the highly viscous pastes must be discharged with a considerable mechanical expenditure and a loss of material.

Also the powder preparations of the aryl-pararosaniline sulfonic acid pigments with natural resin or modified natural resins, which have been described in German Patent Specification No. 1,769,912 or its counterpart U.S. Pat. No. 3,635,745, do not meet all the requirements of the printing ink industry with regard to the dispersibility, the tinctorial strength and the formulation allowance of the printing ink compositions.

In contradistinction to the state of the art mentioned above it has now been found that these pigments may be converted according to this invention into easily dispersible preparations, for example pigment powders of high tinctorial strength and a high softness of grain.

The preparation is carried out in accordance with this invention by dissolving the pigment of the specified formula in water, after adding alkali and suitably while heating, preferably to 50° to 100° C., then adding the synthetic resin—suitably in an aqueous or organic solution—and optionally the surfactant, and precipitating the thus-modified pigment from the resulting aqueous-alkaline dyestuff solution by adding a mineral acid, preferably at a pH value of from 2 to 5, particularly from 2 to 3.5.

For making the aqueous alkaline pigment solution, sodium or potassium hydroxide are most appropriate. The pigments are dissolved in particular at a temperature of from 80° to 100° C.

Especially suitable are synthetic resins as disclosed in U.S. Pat. No. 3,300,424 which is hereby incorporated by reference. Preferred are products which are made water-soluble by neutralizing them with an organic base, which products consist essentially, on the one hand, of an adduct of maleic anhydride to a hydroxyl-free mixed ester of fatty oils and rosin acids, the adduct being partially esterified with a polyol, and, on the other hand, of a water-dilutable melamine-formaldehyde condensation product partially etherified with methanol.

Preferred components (I) have an average molecular weight from 2000 to 3000 and preferred synthetic resins (B) have a dynamic viscosity of from 0.5 to 1.5 Pas, measured in a 50% by weight aqueous solution at 20° C.

The amount of resin employed is suitably in the range of from 4 to 25% by weight, preferably from 7 to 15% by weight, calculated on the weight of the dry starting pigment, depending on the pigment and the intended field of application of the preparation.

Suitable surfactants are the anionic or non-ionic products commonly used in the dispersing of dyestuffs or pigments. As examples there may be mentioned fatty alcohol sulfonates, alkylaryl sulfonates, and salts of sulfosuccinic acid esters, or as effective non-ionic surfactants there are cited polyalkylene ethers of fatty alcohols or alkyl phenols or naphthols or block polymers of ethylene oxide with propylene oxide.

There may also be used mixtures of surfactants in order to achieve a better distribution of the synthetic resins employed during the precipitation process. The amount of surfactant used is suitably in the range of from 1 to 5% by weight, depending on the synthetic resin used.

In addition, small amounts or organic solvents as solubilizers may be advantageous for the manufacture of the mixture of resin and surfactant.

Preferred preparing agents contain the synthetic resin and the surfactant in a weight ratio of from 1:0.15 to 0.4, especially 1:0.3. Preferred pigment preparations contain from 95 to 75% by weight of pigment and from 25 to 5% by weight of preparing agent.

After drying the moist press cakes obtained from the precipitated material, there are obtained soft grain products which can be ground without difficulty and which do not show a tendency to agglutination. The process of the invention is particularly suitable for continuous operation.

The pigment preparations are particularly appropriate for use in printing inks, duplicating papers or carbon papers and typewriter ribbons.

The pigment preparations of the invention may be dispersed very easily with the dispersing machines common in printing ink industry. The printing inks prepared with the same may be printed in an unobjectionable manner, do not show any tendency towards "furring" or toning, in spite of the use of surfactants, and yield full glossy prints with a favorable brightening behavior.

The tinctorial strength of the pulverulent preparations of the invention is about twice as high as that of flushing pastes, so that the formulation of printing pastes leaves a greater allowance for additives that improve the general properties. Due to the low resin content and the resulting low influence on the viscosity in the formulation of printing inks, the pulverulent preparations of the invention may be used in more varied fields of application.

The preparations of the invention may be stored for an unlimited period of time, whereas flushing pastes become thick mainly by the action of heat, thus being fast to storage only for a limited period of time. The preparations according to this invention are more appropriate for dosing, they may be discharged quantitatively from the containers and can for example be transported pneumatically from a storage vessel to the processing device, while being dosed automatically.

The following Examples further illustrate the invention.

EXAMPLE 1

238 Parts by weight of an aqueous press cake containing 21% by weight of the triphenyl-pararosaniline monosulfonic acid of the formula

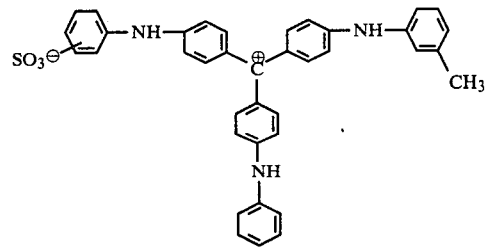

were suspended in 1000 parts by weight of water. After adding 9.5 parts by weight of sodium hydroxide, the mixture was heated to 90° to 100° C., until the pigment was dissolved.

To the hot pigment solution were added 11.5 parts by weight of an approximately 57% by weight aqueous preparing mixture consisting of
  I. an addition compound of castor oil, linseed oil, French rosin, glycerol and maleic anhydride, which compound is partially saponified with triethylamine and esterified with a dimethylol cresol (according to U.S. Pat. No. 3,300,424, Example (7)),
  II. a melamine resin partially etherified with methanol and prepared according to known methods of 1 mol of melamine, 6 mols of formaldehyde and 8 mols of methanol, and
  III. a reaction product of n-octyl naphthol with 10 mols of ethylene oxide.

The mixture of I/II/III was composed in a weight ratio of 6:1:2. It was stirred until it was completely homogeneous, and thereafter the prepared pigment was precipitated at a pH of 2.4 with 110 parts by weight of 15% by weight sulfuric acid. The product was filtered off with suction, washed until it was free from salt and dried at 70° to 75° C. in a drier with circulating air. There were obtained 55.5 parts by weight of an 88% by weight blue pigment preparation. Said pigment preparation was ground and could be processed very well and with little dispersing energy to yield printing inks of a high tinctorial strength.

EXAMPLE 2

The process was carried out as has been described in Example 1, save for using 184.5 parts by weight of a 27.1% by weight aqueous press-cake of the pigment and, as component III in the preparing mixture, 1.5 parts by weight of a commercial sulphonated and oxalkylated fatty acid wetting and dispersing agent.

An ink containing 15% by weight of the pigment preparation obtained was made by mixing 6 parts by weight of the pigment preparation, 33.6 parts by weight of a varnish (consisting of 40% by weight of a colophony-modified phenolic resin, 5% by weight of an alkyd resin, 20% by weight of linseed oil and 35% of mineral oil) and 0.4 part by weight of siccative and passing the mixture four times over a three-roller mill at a pressure of about 15 bar and a temperature of about 20° C.

An ink containing 7.5% by weight of the pigment preparation was obtained by diluting the ink containing 15% with the same amount by weight of the varnish as described above.

12 mg of these inks were printed onto art printing paper with a metal cliché.

EXAMPLE 3

(Comparative Example)

The process of Example 2 was repeated to prepare comparative inks containing 15% and 7.5% by weight, respectively, of the same pigment, but substituting for the aqueous resin additive mixture 60 parts by weight of a 10% by weight aqueous alkaline solution of colophony prepared as described in Example 1 of German Patent Specification No. 1 769 912 and its U.S. counterpart.

12 mg of these inks were printed onto art printing paper with a metal cliché. The prints so obtained were compared with those from Example 2. The latter had twice the tinctorial strength as compared with the former.

EXAMPLE 4

The process was carried out as has been described in Example 1, save for using 263 parts by weight of a 19% by weight aqueous press cake of the pigment of the formula

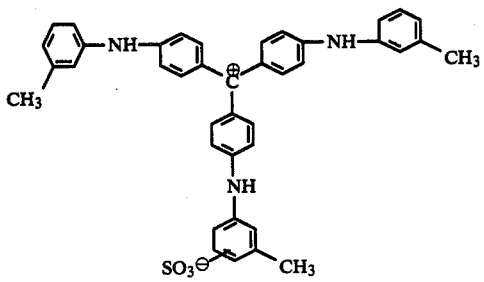

There were obtained 55.2 parts by weight of an 88% by weight blue dye powder with a green shade which could be processed very easily to give printing inks which were free from specks and had a high tinctorial strength.

EXAMPLE 5

417 Parts by weight of a moist 24% by weight press cake of triphenylpararosaniline monosulfonic acid of the formula

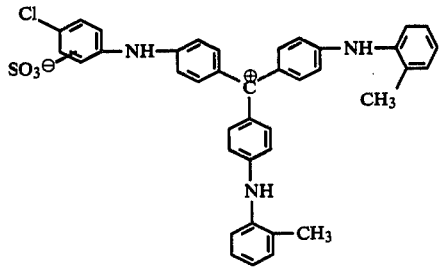

were suspended in 1700 parts by weight of water. After the addition of 17.5 parts by weight of sodium hydroxide the mixture was heated to 95° C., the pigment thus being dissolved. 48 parts by weight of an approximately 52% by weight aqueous preparing mixture consisting of
 I. a rosin-modified addition compound of soy bean oil and maleic anhydride, the compound being esterified with trimethylol propane (according to U.S. Pat. No. 3,300,424, Example (5)), and
 II. a melamine resin partially etherified with methanol and prepared of 1 mol of melamine, 6 mols of formaldehyde and 8 mols of methanol, as well as
 III. a methyl-naphthalene-methane sulfonate were added to the hot pigment solution which was thoroughly mixed.

The I:II:III mixture was prepared in the weight ratio of 5:1:2. Thereafter 205 parts by weight of 15% by weight sulfuric acid were added, the prepared pigment thus being precipitated at a pH of 2.2.

The product was filtered off with suction, washed until it was free from salt and dried at 70° to 75° C. in the drier with circulating air. There were obtained 121.5 parts by weight of an 80% by weight blue powder which could easily be ground and yielded violet-blue printing inks free from specks and having a high tinctorial strength requiring little dispersing energy.

EXAMPLE 6

The process was carried out as in Example 5, save for using an ethylene oxide-propylene oxide block copolymer (molecular weight about 8000) as surfactant in the preparing mixture under III and thereafter spraying the precipitated aqueous pigment preparation suspension in a spray drier with a two-component nozzle at an input temperature of 240° C. and an output temperature of from 80° to 90° C. A free-flowing powder was obtained which could be processed very well, to yield printing inks of a high tinctorial strength, with little dispersing energy.

We claim:
1. In a dispersible pigment composition in which the pigment alone is a difficultly dispersible one having the formula

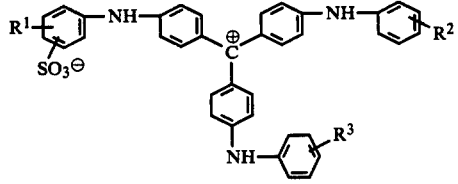

in which $R^1$, $R^2$ and $R^3$ independently of each other are hydrogen, chlorine, bromine, alkyl of 1 to 3 carbon atoms or alkoxy of 1 to 3 carbon atoms, and the pigment is combined with a resinous modifier, the improvement according to which the resinous modifier is
a synthetic resin which is water-soluble when partially or totally neutralized with a nitrogen base, which resin consists essentially of a mixture or a partial reaction product of
 (I) an addition compound obtained by reacting 1 part by weight of maleic anhydride with 3 to 6 parts by weight of
  (a) an unsaturated fatty acid containing only double bonds which are isolated or, if conjugated, then in units of no more than two conjugated double bonds, or
  (b) a polyol ester containing no hydroxy groups, deriving from such an unsaturated fatty acid,
 said addition compound being partially esterified with a polyol, and
 (II) a low-molecular, curable aminoplast partially etherified with an alcohol selected from the group consisting of primary alcohols and polyols having at least one primary hydroxy group, the components (I) and (II) being present in about equivalent amounts with regard to the ester-forming groups.

2. A composition as claimed in claim 1, wherein component (I) is an addition compound of 1 part of maleic anhydride with 3 to 4.5 parts of fatty acid or ester.

3. A composition as claimed in claim 1, containing additionally an anionic or nonionic surfactant.

4. A composition as claimed in claim 1, wherein the synthetic resin (B) is a mixture or partial reaction product of
   (I) an adduct of maleic anhydride of a hydroxyl-free mixed ester of a natural oil and a rosin acid, which adduct is partially esterified with a polyol, and
   (II) a water-dilutable melamine-formaldehyde condensation product being partially etherified with methanol.

5. A composition as claimed in claim 1, wherein component I has a molecular weight of 2,000 to 3,000 and the synthetic resin (B) has a dynamic viscosity at 20° C. in 50% aqueous solution of 0.5 to 1.5 Pas.

6. A composition as claimed in claim 1, containing (A) 95 to 75% by weight of pigment and (B) 25 to 5% by weight of resin.

7. A process for preparing a composition as defined in claim 1, which comprises dissolving the pigment in an aqueous alkaline medium, adding to this solution the synthetic resin and precipitating the composition by means of a mineral acid.

8. A process for preparing a composition as defined in claim 3, which comprises dissolving the pigment in an aqueous alkaline medium, adding to this solution the synthetic resin and the surfactant and precipitating the composition by means of a mineral acid.

9. A process as claimed in claim 8, wherein the composition is precipitated in a pH range of 2 to 5.

10. A process as claimed in claim 9, wherein the pH range is 2 to 3.5.

11. A process as claimed in claim 8, wherein per part by weight of resin 0.15 to 0.4 L parts of surfactant are added.

12. A process for pigmenting articles, which comprises incorporating into or coating said article with a composition as claimed in claim 1.

13. A process as claimed in claim 12, wherein said article is a printing ink, a duplicating paper, carbon paper or a typewriter ribbon.

14. The combination of claim 1 in which the pigment composition is a powder.

* * * * *